US012793570B2

(12) United States Patent
Lee

(10) Patent No.: US 12,793,570 B2
(45) Date of Patent: Nov. 10, 2026

(54) SWING MOTION PLATE AND MOTION SIMULATOR USING THE SAME

(71) Applicant: KOREA AEROSPACE RESEARCH INSTITUTE, Daejeon (KR)

(72) Inventor: Jeong Won Lee, Sejong-si (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 452 days.

(21) Appl. No.: 18/475,037

(22) Filed: Sep. 26, 2023

(65) Prior Publication Data

US 2024/0105077 A1 Mar. 28, 2024

(30) Foreign Application Priority Data

Sep. 27, 2022 (KR) ........................ 10-2022-0122118

(51) Int. Cl.
*G09B 9/12* (2006.01)

(52) U.S. Cl.
CPC ...................................... *G09B 9/12* (2013.01)

(58) Field of Classification Search
CPC ........................................................ G09B 9/12
See application file for complete search history.

(56) References Cited

U.S. PATENT DOCUMENTS

2019/0200772 A1* 7/2019 Ku ........................ A47C 3/0251

FOREIGN PATENT DOCUMENTS

| | | | | | |
|---|---|---|---|---|---|
| JP | 5031253 | B2 | 9/2012 | | |
| JP | 5137823 | B2 | 2/2013 | | |
| KR | 100700888 | B1 | 3/2007 | | |
| KR | 20090104207 | A | 10/2009 | | |
| KR | 101743036 | B1 | 6/2017 | | |
| KR | 102014227 | B1 | 8/2019 | | |
| KR | 102014277 | B1 * | 8/2019 | ............. | F16H 55/02 |
| WO | WO-2020091134 | A1 * | 5/2020 | ............. | F16H 55/17 |

OTHER PUBLICATIONS

KR102014277B1 Translation (Year: 2019).*
GoBilda "Pinion Gear" May 18, 2022. https://web.archive.org/web/20220518194044/https://www.gobilda.com/pinion-gears/; (Year: 2022).*
WO2020091134A1 Translation (Year: 2020).*

* cited by examiner

*Primary Examiner* — Jay Trent Liddle
*Assistant Examiner* — Selwa A Alsomairy
(74) *Attorney, Agent, or Firm* — McCoy Russell LLP

(57) ABSTRACT

The present disclosure provides a simulator for implementing smooth motion in multiple axes to implement various driving and flight environments in a real environment, and more particularly, a swing motion plate that has a structure stacked in multi stages, is configured so that each stage is stacked to implement movement on a different axis, but has a structure that allows each stage to move smoothly and without interruption in order to smoothly implement more realistic movements, and can drive a device by using a worm gear structure so that a load applied to the device is not concentrated when each stage drives each movement, and a motion simulator using the same.

15 Claims, 12 Drawing Sheets

SWING MOTION PLATE AND MOTION SIMULATOR USING THE SAME

CROSS-REFERENCE TO RELATED APPLICATION

This application claims priority under 35 U.S.C. § 119 to Korean Patent Application No. 10-2022-0122118, filed on Sep. 27, 2022, in the Korean Intellectual Property Office, the disclosure of which is incorporated herein by reference in its entirety.

TECHNICAL FIELD

The following disclosure relates to an aircraft piloting simulator or a simulator that implements motion in multiple axes for entertainment purposes, and more particularly, to a swing motion plate that performs actions on 3 and 6 axes and has a structure that minimizes power applied to a motor implementing the actions, and a motion simulator using the same.

BACKGROUND

Unlike aircraft that uses power through existing mechanical engines, a human-powered aircraft is an aircraft that generates power through human muscles and uses the power for take off and landing and flight of the aircraft. Pilots of the human-powered aircraft require considerable physical strength to generate power necessary for flight. In addition, since the human-powered aircraft are greatly affected by wind, and adjusting force applied to pedals has a significant impact on piloting, only experienced pilots may pilot the human-powered aircraft, so pilots require a lot of training time.

However, since it is difficult to secure sufficient training space for training on the piloting of the human-powered aircraft and a training environment such as various weather conditions and situations in real situations, it is difficult to perform pilot training using the actual human-powered aircraft.

Therefore, for the pilot training of the human-powered aircraft on the ground, there is a need for a flight motion simulator provided on a ground for ground training devices capable of equally implementing situations for various movements that may occur in an actual flight environment.

In addition, a motion simulator may be incorporated into a virtual environment controlled by a computer, and are being introduced and actively applied in various fields depending on the purpose. In particular, in a motion simulator for entertainment purposes that allows users to experience three dimensions by reproducing dynamic changes according to the virtual environment, in order to simulate a realistic flight environment by sliding, moving, and rotating front, back, left, and right in virtual space and to more realistically implement various actions such as flight in space with realistic gravitational acceleration along with the ascent or descent when launching from a space launch pad, driving or turning on curves and slopes of a road car or bike racing, and movement of high-speed boats on the sea, simulators are constantly being developed to be able to control various movements.

Accordingly, the conventional motion simulators generally use a method of driving a plurality of simulators using a compression cylinder and a servo motor to realistically express movement of an object. However, the conventional motion simulator is pointed by passengers in that it is driven by a hydraulic or electric cylinder, causing a feeling of interrupted action, and it has a limited range of front, back, left, and right movement, making the movement of the simulator unnatural.

SUMMARY

An embodiment of the present disclosure is directed to providing a simulator for implementing smooth motion in multiple axes to implement various driving and flight environments in a real environment, and providing a swing motion plate that enables actions on 3 and 6 axes and natural and uninterrupted actions in movement, and includes a structure that distributes a load in a device that implements movement, and a motion simulator using the same.

In one general aspect, a swing motion plate includes: a first stage including a rectangular frame formed by a plurality of first frames and arc-shaped first guide holes formed in a pair of the first frames arranged in an X-axis direction, respectively; a second stage including a rectangular frame formed by a plurality of second frames and first protrusions having a predetermined area stacked on an upper side of the first stage, inserted into the first guide holes, and formed on a pair of the second frames arranged in the X-axis direction, the pair of the second frames arranged in a Y-axis direction being formed with arc-shaped second guide holes, respectively; a third stage including a first plane having a predetermined area, a pair of third frames arranged in the Y-axis direction of the first plane respectively, and second protrusions having a predetermined area stacked on an upper side of the second stage, inserted into the second guide holes, and formed on the third frames; and a fourth stage including a second plane having a predetermined area and a rotation means stacked on an upper side of the third stage and rotating the second plane about a central axis.

The first stage may include a first worm extending a predetermined length in the Y-axis direction, one end of the first worm being fixed to the first frame, and the other end of the first worm having a thread formed along a length, and the second stage includes a first worm wheel that is formed at a position corresponding to the first worm while having a length, a lower end of the first worm wheel being formed in an arc shape and being a tooth engaging with the first worm.

The first worm may further include a motor, and the first worm may rotate on its axis by the motor, and may engage with the first worm wheel so that the first protrusion moves within the first guide hole and the second stage performs roll rotation.

The second stage may be formed to be smaller than an area of the first stage, and an outer side of the second frame may be stacked in contact with an inner side of the first frame.

The first worm wheel may penetrate through a first shaft connecting an inner side of the pair of the second frames arranged on an X axis and may be coupled to the second stage.

The second stage may include a second worm extending a predetermined length in the X-axis direction, one end of the second worm being fixed to the first frame, and the other end of the second worm having a thread formed along a length, and the third stage may include a second worm wheel that is formed at a position corresponding to the second worm while having a length, a lower end of the second worm being formed in an arc shape and may be a tooth engaging with the second worm.

The second worm may further include a motor, and the second worm may rotate on its axis by the motor, and engage with the second worm wheel so that the second protrusion moves within the second guide hole and the third stage performs pitch rotation.

The third stage may be formed to be smaller than an area of the second stage, and an outer side of the third frame may be stacked in contact with an inner side of the second frame.

The second worm wheel may penetrate through a second shaft connecting an inner side of the pair of the third frames and may be coupled to the third stage.

The fourth stage may include a third worm wheel arranged in a circular shape having a predetermined diameter on a lower surface of the second plane, and the third stage may include a third worm extending a predetermined length and arranged at any one end in a direction in which a longitudinal direction is tangent to the third worm wheel in the first plane.

The third worm may further include a motor, and the third worm may rotate on its axis by the motor and engage with the third worm wheel so that the third stage performs yaw rotation.

A diameter of the third worm wheel may be smaller than that of the first plane.

In another general aspect, a motion simulator using the swing motion plate includes: a lower support that is supported on a ground and includes a lever support means freely rotating at an upper end; an upper support having a length in one direction, a center of the upper support being connected to the lever support means, and moving from the lower support by the lever support means; and a swing motion plate having the first stage, the second stage, the third stage, and the fourth stage stacked thereon and coupled to each other, and connected to the upper support.

The upper support may be connected to the swing motion plate through a rack and pinion gear structure, and move in a longitudinal direction of the upper support.

The upper support may include a cable and a motor formed at both ends thereof, respectively, and a length of the cable may be adjusted by driving the motor on at least one of the both ends to adjust a distance between the ground and an end of the upper support.

The lever support means may include a fourth worm wheel arranged in a circular shape having a predetermined diameter on a lower surface of the upper support, and a fourth worm arranged in a tangential direction of the fourth worm wheel at an upper end of the lower support, and as the fourth worm and the fourth worm wheel engage with each other, the upper support may rotate about the lever support means.

DETAILED DESCRIPTION OF MAIN ELEMENTS

Figure 1:
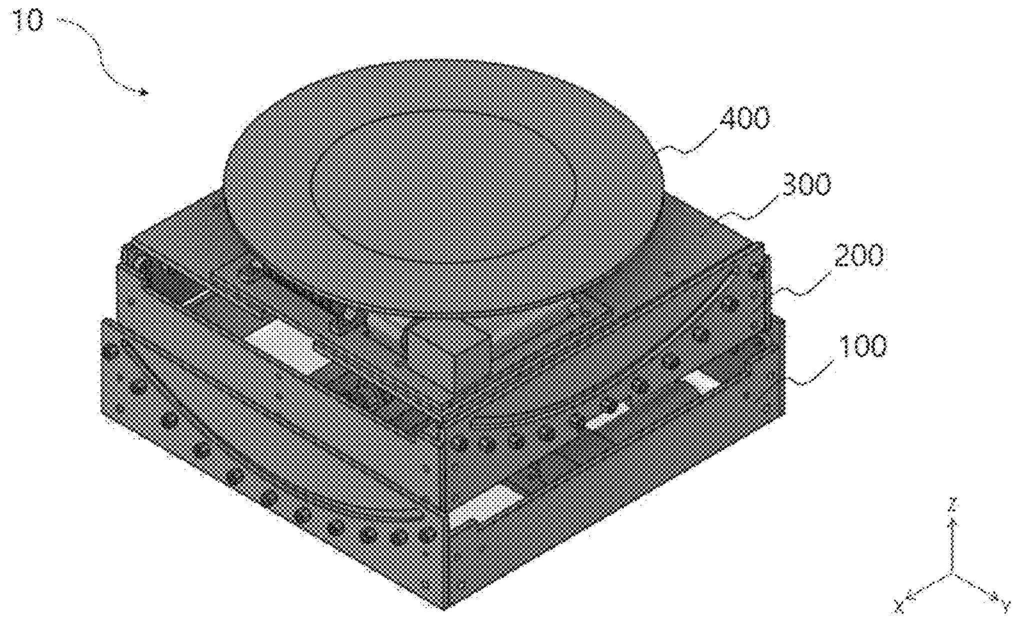
FIG. 1 is an overall perspective view of a swing motion plate.

1: Motion simulator
10: Swing motion plate
20: Lower support
30: Upper support
31: Lever support means
100: First stage
110: First frame
111: First guide hole
120: First worm
200: Second stage
210: Second frame
211: Second guide hole
212: First protrusion
220: Second worm
230: First worm wheel
240: First shaft
300: Third stage
310: First plane
320: Third frame
321: Second protrusion
330: Third worm
340: Second worm wheel
350: Second shaft
400: Fourth stage
410: Second plane
420: Rotation means
421: Third worm wheel

DETAILED DESCRIPTION OF EMBODIMENTS

Hereinafter, the technical spirit of the present disclosure will be described in more detail with reference to the accompanying drawings. Terms and words used in the present specification and claims are not to be construed as a general or dictionary meaning, but are to be construed as meaning and concepts meeting the technical ideas of the present disclosure based on a principle that the present inventors may appropriately define the concepts of terms in order to describe their disclosures in best mode.

Therefore, configurations described in exemplary embodiments and the accompanying drawings of the present disclosure do not represent all of the technical spirits of the present disclosure, but are merely most preferable embodiments. Therefore, the present disclosure should be construed as including all the changes, and substitutions included in the spirit and scope of the present disclosure at the time of filing this application.

Hereinafter, the technical spirit of the present disclosure will be described in more detail with reference to the accompanying drawings. However, the accompanying drawings are only examples shown in order to describe the technical idea of the present disclosure in more detail. Therefore, the technical idea of the present disclosure is not limited to shapes of the accompanying drawings.

Figure 2:
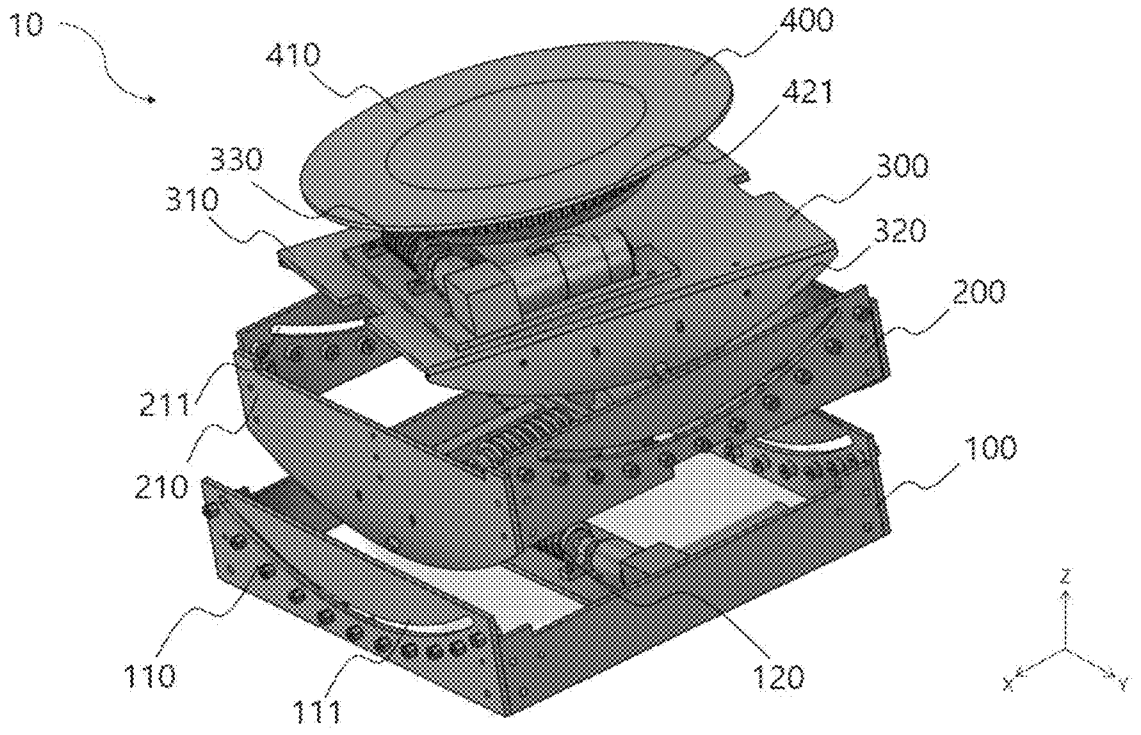
FIG. 2 is an overall exploded perspective view of the swing motion plate.

Referring to FIGS. 1 and 2, the present disclosure relates to a swing motion plate 10 that implements movement in multiple axes. The swing motion plate 10 includes a first stage 100 including a rectangular frame formed by a plurality of first frames 110 and arc-shaped first guide holes 111 formed in the pair of first frames 110 arranged in an X-axis direction, respectively; a second stage 200 including a rectangular frame formed by a plurality of second frames 210, first protrusions 212 having a predetermined area stacked on an upper side of the first stage 100, inserted into the first guide holes 111, and formed on the pair of second frames 210 arranged in the X-axis direction, in which the pair of the second frames 210 arranged in a Y-axis direction is formed with arc-shaped second guide holes 211, respectively; a third stage 300 including a first plane 310 having a predetermined area, a pair of third frames 320 arranged in the Y-axis direction of the first plane 310, respectively, and second protrusions 321 having a predetermined area stacked on an upper side of the second stage 200, inserted into the second guide holes 211, and formed on the third frames 320; and a fourth stage 400 including a second plane 410 having a predetermined area and a rotation means 420 stacked on an upper side of the third stage 300 and rotating the second plane 410 about a central axis. In this case, the swing motion plate 10 of the present disclosure implements movement about 3 axes, in which the first stage 100 is supported on a ground or a plane of any device, the first protrusion 212 moves within the first guide hole 111 and thus the second stage 200 performs roll rotation in the X-axis direction, the second protrusion 321 moves within the second guide hole 211 and thus the third stage 300 performs pitch rotation in the Y-axis direction, and the second plane 410 rotates and thus the fourth stage 400 performs yaw rotation about a Z axis. That is, relative motion between the first stage 100 and the second stage 200 is performed by the engagement and movement between the first guide hole 111 and the first protrusion 212, and relative motion between the second stage 200 and the third stage 300 is performed by the engagement and movement between the second guide hole 211 and the second protrusion 321.

Figure 3:
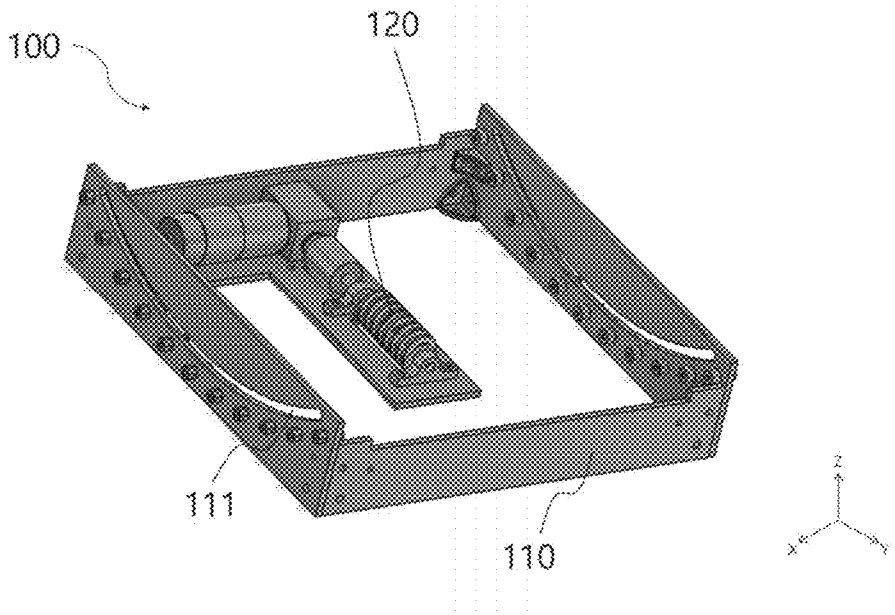
FIG. 3 is a perspective view of a first stage of the swing motion plate.
Figure 5:
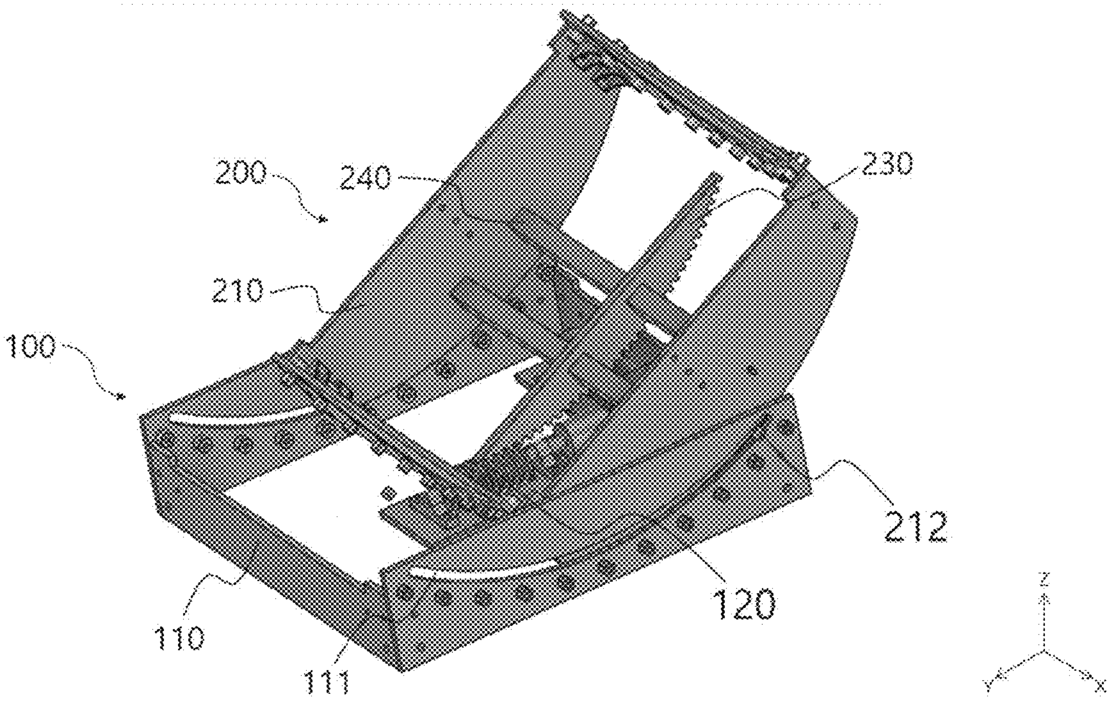
FIG. 5 is a partially coupled perspective view of the first and second stages of the swing motion plate.

Referring to FIGS. 3 and 5, the first stage 100 is arranged at a lower end of the swing motion plate 10 in the form of a rectangular frame by a plurality of first frames 110, in which the first frame 110 is composed of at least four pieces, and the first frames 110 may be coupled with each other to form the first stage 100. The first frame 110 may be used without size and shape limitations as long as a lower surface can be supported on any plane. The first frame 110 may be composed of three pieces to form a triangular frame, or may be composed of four or more pieces to form the first stage 100 as a polygonal frame. Alternatively, the first frame 110 may be curved to form a circular frame. In addition, the plurality of first frames 110 may be formed in different shapes. For example, the first frame 110 may be a rectangular flat frame that is longer in the horizontal direction. The first stage 100 may be formed by making a flat plane be erected in the Z-axis direction and making both sides of the adjacent first frames 110 contact each other. The first stage 100 has arc-shaped first guide holes 111 that protrude downward from the pair of first frames 110 arranged on the X axis, respectively, among the plurality of first frames 110. In this case, a curvature of the first guide hole 111 may be determined depending on the degree to which the second stage 200 is to rotate. In addition, the curvature may be formed depending on a height of the flat plane of the first frame 110. It is preferable that a size of the first guide hole 111 corresponds to a size of the first protrusion 212 formed on the second stage 200.

Figure 4:
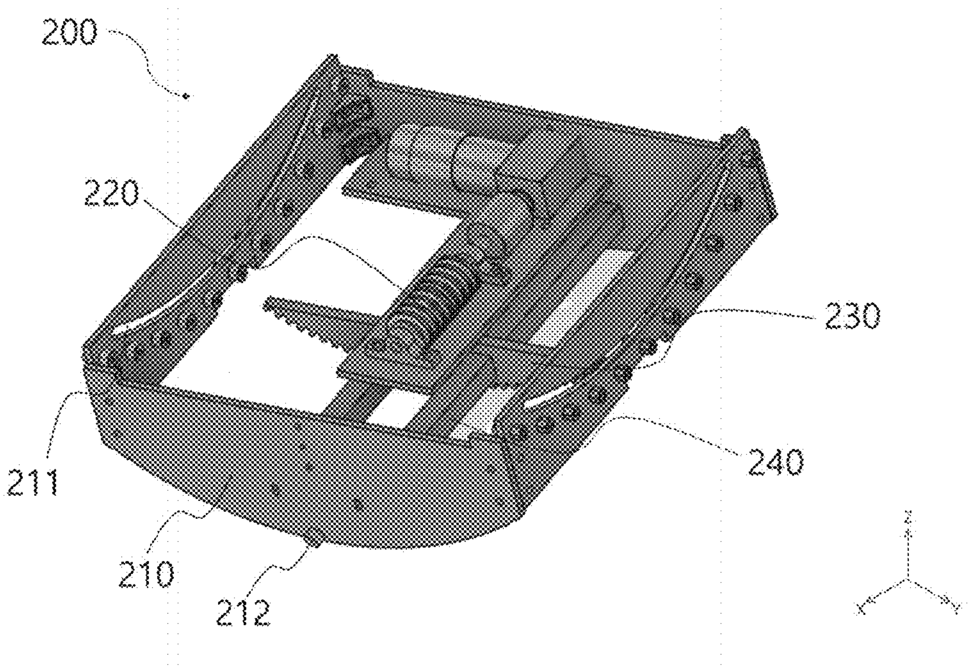
FIG. 4 is a perspective view of a second stage of the swing motion plate.

Referring to FIGS. 4 and 5, the second stage 200 is stacked on the upper side of the first stage 100 in the form of a rectangular frame by a plurality of second frames 210 and arranged on the swing motion plate 10. The second frame 210 is composed of at least four pieces, and the second frame 210 may be coupled with each other to form the second stage 200. The second frame 210 may be used without size and shape limitations. The second frame 210 may be composed of three pieces to form a triangular frame, or may be composed of four or more pieces to form a polygonal frame. Alternatively, the second frame 210 may be curved to form a circular frame. In addition, the plurality of first frames 110 may be formed in different shapes. For example, the second frame 210 may be a rectangular flat frame that is longer in the horizontal direction. The second stage 200 may be formed by making a flat plane be erected in the Z-axis direction and making both sides of the adjacent second frames 210 contact each other and may be coupled with each other. In addition, the second frame 210 is formed to be smaller in size than the first frame 110, so that the second stage 200 may be formed as a rectangular frame having a smaller area than the first stage 100. In more detail, the second stage 200 is formed to be smaller than the area of the first stage 100, and an outer side of the second frame 210 is located on an inner side of the first frame 110 and is stacked. The second stage 200 has arc-shaped second guide holes 211 that protrude downward from the pair of second frames 210 arranged on the Y axis, respectively, among the plurality of second frames 210. In this case, a curvature of the second guide hole 211 may be determined depending on the degree to which the third stage 300 is to rotate. In addition, the curvature may be formed depending on a height of a flat plane of the second frame 210. It is preferable that a size of the second guide hole 211 corresponds to the size of the first protrusion 212 formed on the third stage 300.

In addition, referring to FIG. 4, the second stage 200 includes the first protrusion 212 that protrudes a predetermined area on each of the pair of second frames 210 arranged on the X axis among the plurality of second frames 210. The first protrusion 212 protrudes toward the outer side of the second stage 200. It is preferable that the first protrusion 212 is formed in a size and shape that may be fitted into the first guide hole 111. The first protrusion 212 may be formed in the shape of an arc like the first guide hole 111. However, it is preferable that a length of the first protrusion 212 is shorter than that of the first guide hole 111 so that it may move within the first guide hole 111. In this case, as an example of the present disclosure, the pair of second frames 210 arranged in the X-axis direction where the first protrusion 212 is formed may be formed in the shape of an arc with the lower end protruding downward. That is, the lower end of the second frame 210 may be formed in a shape corresponding to the shape of the first guide hole 111. Accordingly, in the pair of second frames 210 arranged in the X-axis direction, the first protrusion 212 is formed with the first protrusion 212 protruding from the curve of the lower end portion toward the outer side of the second stage 200. In this case, for ease of device installation, the first stage 100 formed by the first frame 110 and the second stage 200 formed by the second frame 210 are formed in a shape corresponding to each other. Therefore, the second stage 200 is stacked on the upper side of the first stage 100, and since the size of the second stage 200 is smaller than that of the first stage 100, the second stage 200 is stacked on the inner side of the first stage 100. In addition, an outer side portion of the pair of second frames 210 in the X-axis direction in which the lower end of the second stage 200 is formed in an arc shape is in contact with an inner side portion of the pair of first frames 110 in the X-axis direction of the first stage 100 and is stacked, so the first stage 100 and the second stage 200 are coupled with each other in the form that the first protrusion 212 of the second stage 200 is inserted into the first guide hole 111. Accordingly, the first protrusion 212 of the second stage 200 is fitted into the first guide hole 111 of the first stage 100, and the first protrusion 212 slides freely within the first guide hole 111 that is formed in a curved line, so the second stage 200 performs a roll operation that rotates about the X axis.

Figure 6:
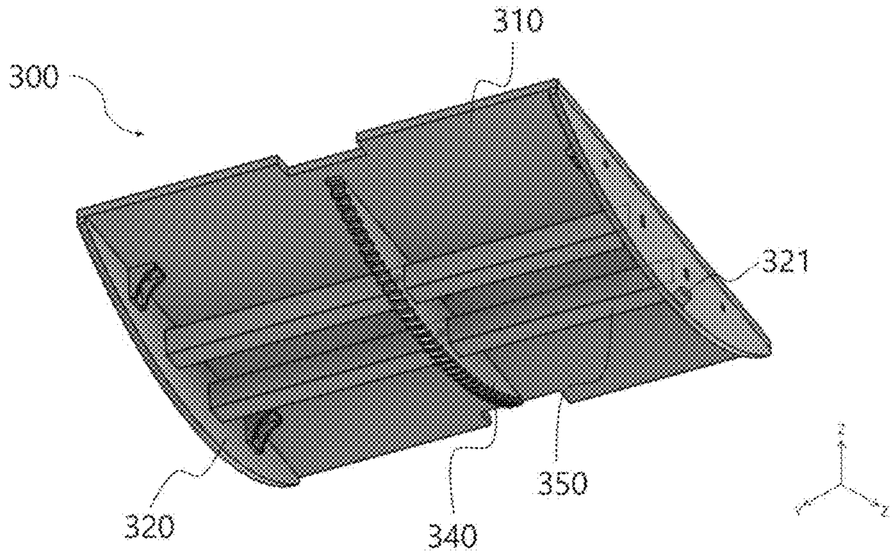
FIG. 6 is a perspective view of a third stage of the swing motion plate.
Figure 7:
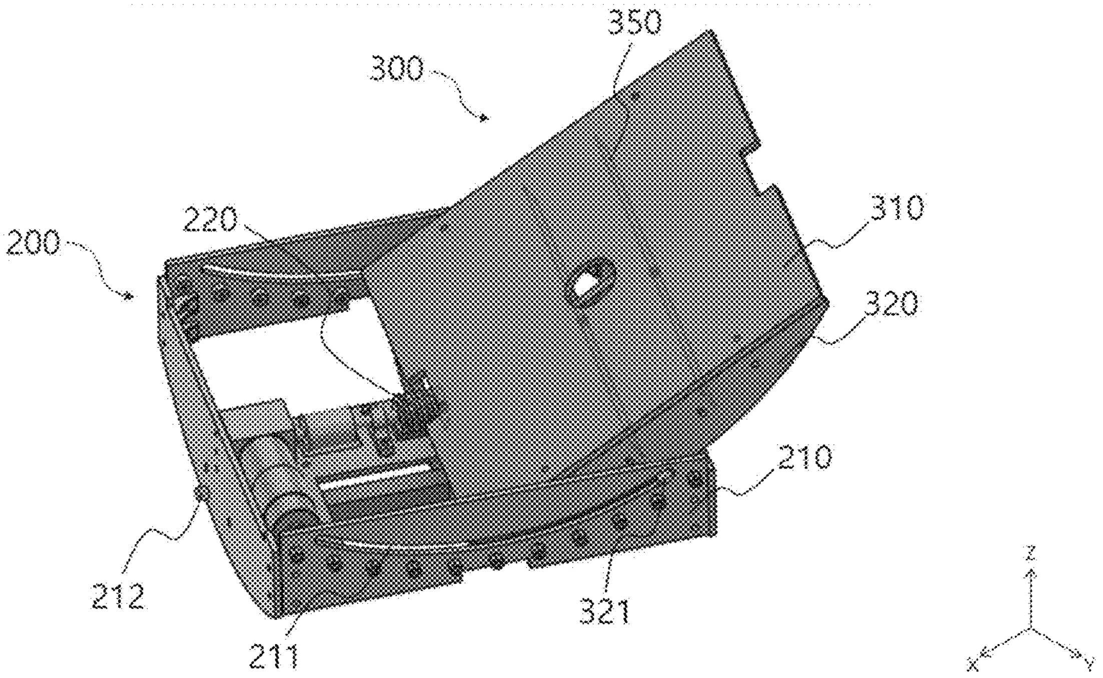
FIG. 7 is a partially coupled perspective view of the second and third stages of the swing motion plate.

Referring to FIGS. 6 and 7, the third stage 300 includes a first plane 310 having a predetermined area and a pair of third frames 320 arranged at edges of the first plane 310, respectively, to be stacked on the upper side of the second stage 200, and is arranged on the swing motion plate 10. The third frame 320 is composed of at least two pieces and may be arranged to face any one axis of the first plane 310, and may be coupled to the first plane 310 to form the third stage 300. The third frame 320 may be circular, bar-shaped, polygonal, etc., without limitations on shape and size. The third frame 320 may be configured to have a shape selected according to the user's needs. The first plane 310 constituting the third stage 300 may be formed of a plane corresponding to the frame formed by the second frame 210 of the second stage 200. The third frame 320 is composed of a pair and is arranged at edges of the first plane 310 in the Y-axis direction, respectively, so the third stage 300 may be formed. For example, the first plane 310 may be formed in a rectangular shape. Each of the third frames 320 is formed of a rectangular flat frame arranged at each edge of the first plane 310 arranged on the Y axis, so the flat plane may be erected in the Z-axis direction and the upper end portion may be coupled to the first plane 310. In addition, the third frame 320 may be formed to be smaller than the size of the second frame 210, and the first plane 310 may be formed to be smaller than the inner side space of the second stage 200. In more detail, the third stage 300 is formed to be smaller than the size of the second stage 200, and the outer side of the third frame 320 is located on an inner side of the second frame 210 and is stacked.

In addition, referring to FIG. 6, the third stage 300 includes second protrusions 321 that protrude from the third frame 320 to a predetermined area. The second protrusion 321 is preferably formed to protrude toward the outer side of the third stage 300 and has a size and shape that may be fitted into the second guide hole 211. The second protrusion 321 may be formed in the shape of an arc corresponding to the second guide hole 211. However, it is preferable that the length of the second protrusion 321 is shorter than that of the second guide hole 211 so that the second protrusion 321 may move smoothly within the second guide hole 211. In this case, as an example of the present disclosure, the third frame 320 may be formed in the shape of an arc with the lower end protruding downward. That is, the lower end of the third frame 320 may be formed in a shape corresponding to the shape of the second guide hole 211. Therefore, the third stage 300 is stacked on the upper side of the second stage 200, and since the size of the third stage 300 is smaller than that of the second stage 200, the third stage 300 is stacked on the inner side of the second stage 200. In addition, the third stage 300 includes the lower end of the third frame 320 formed in an arc shape and the second protrusion 321 formed at a predetermined area at the lower end. The outer side of the third frame 320 and the inner side of the second frame 210 arranged on the Y axis each contact each other and are stacked, so the second stage 200 and the third stage 300 are coupled with each other in the form that the second protrusion 321 of the third stage 300 is fitted into the second guide hole 211. Accordingly, the second protrusion 321 of the third stage 300 is fitted into the second guide hole 211 of the second stage 200, and the second protrusion 321 slides freely within the second guide hole 211 that is formed in a curved line, so the third stage 300 performs a pitch operation that rotates about the Y axis.

Figure 8:
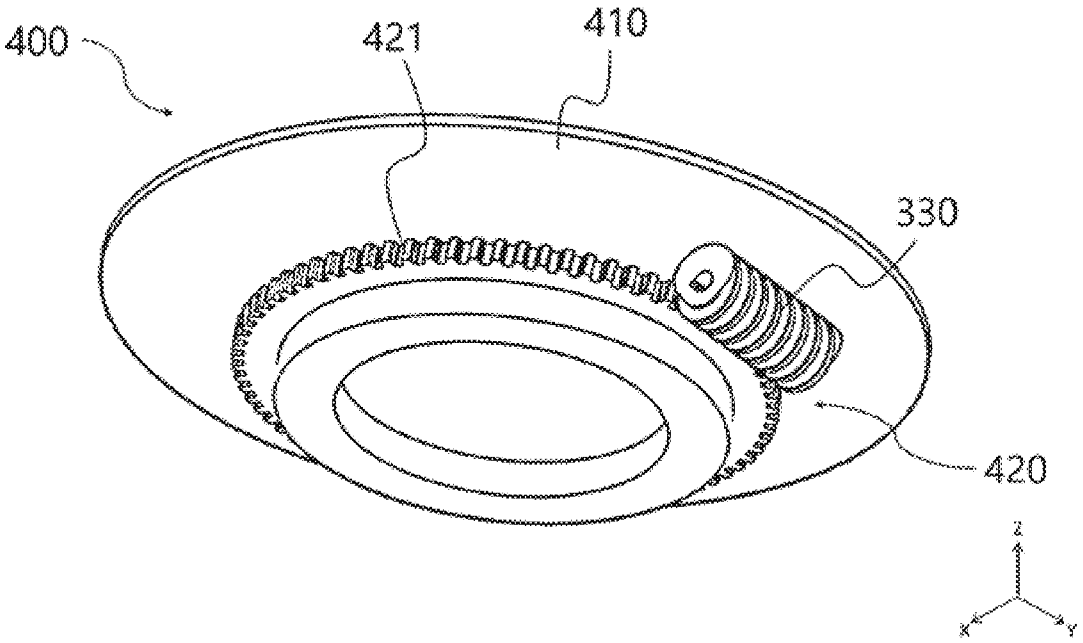
FIG. 8 is a perspective view of a fourth stage of the swing motion plate.
Figure 9:
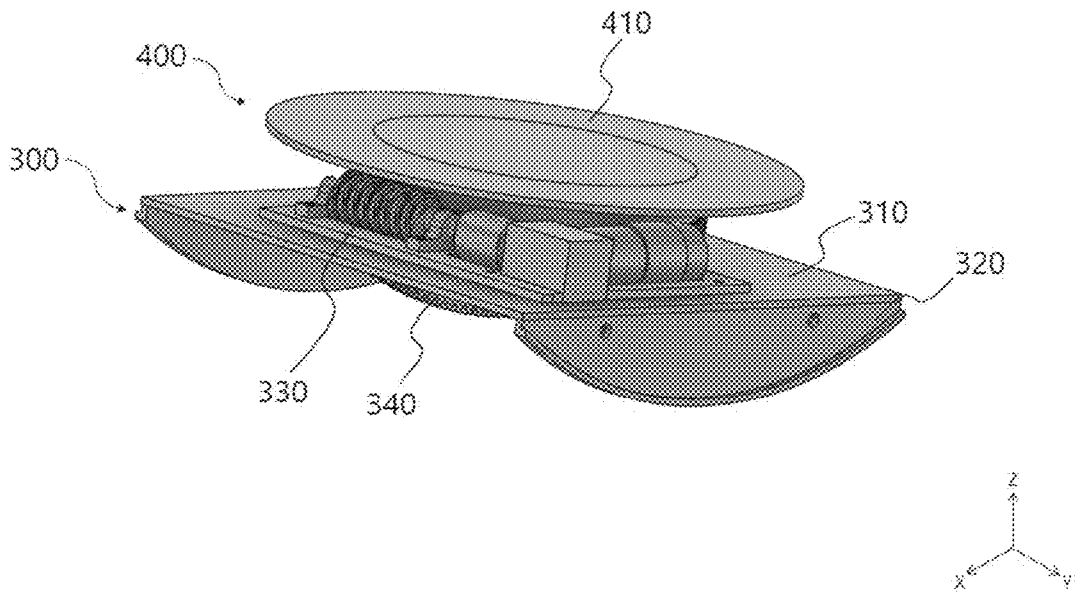
FIG. 9 is a partially coupled perspective view of the third and fourth stages of the swing motion plate.

Referring to FIGS. 8 and 9, the fourth stage 400 includes a second plane 410 of a predetermined area, and is stacked on the upper side of the third stage 300, arranged on the swing motion plate 10, and stacked on the first plane 310 of the third stage 300. The fourth stage 400 is formed to include the rotation means 420 that rotates the second plane 410, and the rotation means 420 is preferably arranged on the lower side of the second plane 410. The second plane 410 may have the same shape or a different shape from the first plane 310 of the third stage 300. In one embodiment of the present disclosure, the second plane 410 may be formed as a circular plane to rotate the second plane 410. In addition, the second plane 410 is formed to have a smaller area than the first plane 310 and may be entirely located on the inner side of the first plane 310 and stacked. The rotation means 420 may be used without limitation in type and shape as long as it is a means that may rotate the second plane 410 about the Z axis. The rotation means 420 may rotate only a predetermined area of the second plane 410, but since it is preferable that there is only one second plane 410, it is appropriate that the rotation means 420 is a means capable of rotating the entire second plane 410. The rotation means 420 may be arranged on the upper surface of the second plane 410, but may be provided on the lower surface of the second plane 410 to ensure smooth driving and add aesthetic effects. It is preferable for operation to have a predetermined gap between the rotation means 420 and the first plane 310. Accordingly, the fourth stage 400 rotates about the Z axis by the rotation means 420, so the fourth stage 400 performs the yaw operation. The rotation means 420 includes a third worm wheel 421 arranged in a circular shape on the lower surface of the second plane 410 and a third worm 330 engaging with the third worm wheel 421, and rotates the second plane 410 about the Z axis.

The swing motion plate 10 of the present disclosure uses a worm gear to automatically implement the movements performed by the second stage 200, third stage 300, and fourth stage 400, thereby having a structure that may realize smoother movement and at the same time distribute the load that may be concentrated on the operating part.

Accordingly, as illustrated in FIG. 5, each first stage 100 includes a first worm 120 so that the second stage 200 performs the roll rotation based on the X axis, and the second stage 200 includes a first worm wheel 230 which is a tooth that engages with the first worm 120. Accordingly, when the first stage 100 and the second stage 200 are stacked and arranged, the first worm wheel 230 engages and moves due to the rotation of the first worm 120, so the second stage 200 performs the roll rotation. In more detail, the first worm 120 is arranged on the inner side of the first frame 110 in the first stage 100, and is formed to extend a predetermined length along the Y-axis direction to perform roll rotation. The first worm 120 may be formed in the form that one end of the first worm 120 is fixed to the inner side of the first frame 110, and the other side thereof is formed with a thread along the length. The first worm 120 has a thread formed on the other side of the axis arranged in the Y-axis direction, and a motor is connected to one end fixed to the first frame 110, so the first worm 120 may rotate on its axis by receiving power from the motor. In this case, the motor is preferably fixed on the inner side of the first frame 110, and may adjust the roll rotation angle by rotating forward or reverse. In addition, the first worm wheel 230 is in the form of a tooth that engages with the first worm 120 and is arranged on the inner side of the second frame 210 in the second stage 200, but preferably in a form where teeth are arranged toward the first end 100 located on the lower side. The first worm wheel 230 is preferably arranged between the second frames 210 arranged in the Y-axis direction. That is, the first worm wheel 230 is arranged horizontally with the first worm 120. Therefore, since the thread of the first worm 120 and the teeth of the first worm wheel 230 move at an angle perpendicular to each other, they may have a structure that may withstand a load according to the load applied to the swing motion plate 10 of the present disclosure. In addition, the first worm wheel 230 is preferably formed to have the maximum length because the longer the tooth portion, the longer the second stage 200 may be driven. That is, it is preferable that the first worm wheel 230 has a length in the Y-axis direction, is formed as long as the inner side of the pair of second frames 210, and is arranged at a vertical upper end of the first worm 120. In addition, the first worm wheel 230 is preferably formed in the form that teeth are arranged at a lower end of a downwardly protruding curved shape so that the thread and teeth of the first worm 120 sequentially contact each other. In addition, in order for the first worm 120 and the first worm wheel 230 to smoothly engage with each other, the first worm wheel 230 is preferably formed to have a length that protrudes downward from the second frame 210. It is preferable that the length of the first worm wheel 230 is about the length at which the teeth of the lower end of the first worm wheel 230 and the upper thread of the first worm 120 may engage with each other. The second stage 200 includes a first shaft 240 that passes through the center of the first worm wheel 230 and is fixed to the pair of second frames 210 on the X axis, respectively, in order to fix the first worm wheel 230. That is, the first shaft 240 penetrates through the center of the first worm wheel 230 on the inner side of the second frame 210 and is arranged in the X-axis direction. In this case, the first shaft 240 may be composed of a plurality of pieces to strengthen the fixing force. Therefore, since the first worm 120 provided in the first stage 100 rotates on its axis in the forward or reverse direction by driving the motor, the teeth of the second worm wheel 340 provided in the second stage 200 sequentially engage with each other, so the second stage 200 may perform the roll rotation. In this case, since the first worm gear may absorb the load from the moment of inertia due to the structure of the first worm gear, it is possible to prevent the load from being applied to the motor.

In addition, as illustrated in FIG. 7, each second stage 200 includes a second worm 220 so that the third stage 300 performs the pitch rotation based on the Y axis, and the third stage 300 includes a second worm wheel 340 which is a tooth that engages with the second worm 220. Accordingly, when the second stage 200 and the third stage 300 are stacked and arranged, the third worm wheel 421 engages and moves due to the rotation of the second worm 220, so the third stage 300 performs the pitch rotation. In more detail, the second worm 220 is arranged on the inner side of the second frame 210 in the second stage 200, and is formed to extend a predetermined length along the X-axis direction to perform the pitch rotation. The second worm 220 may be formed in the form that one end of the second worm 220 is fixed to the inner side of the second frame 210, and the other side thereof is formed with a thread along the length. The second worm 220 has a thread formed on the other side of the axis arranged in the X-axis direction, and a motor is connected to one end fixed to the second frame 210, so the second worm 220 rotates on its axis by receiving power from the motor and is driven. In this case, the motor is preferably fixed and installed on the inner side of the second frame 210, and may adjust the pitch rotation angle by rotating forward or reverse. In addition, the second worm wheel 340 is in the form of a tooth that engages with the second worm 220 and is arranged on the inner side of the third frame 320 in the third stage 300, but preferably in a form where teeth are arranged toward the second stage 200 located on the lower side. The second worm wheel 340 is preferably arranged between the third frames 320 arranged in the X-axis direction. That is, the second worm wheel 340 is arranged horizontally with the second worm 220. Therefore, since the thread of the second worm 220 and the teeth of the second worm wheel 340 move at an angle perpendicular to each other, they may have a structure that can withstand a load according to the load applied to the swing motion plate 10 of the present disclosure. In addition, the second worm wheel 340 is preferably formed to have the maximum length because the longer the tooth portion, the longer the operation of the third stage 300 may be driven. That is, it is preferable that the second worm wheel 340 has a length in the X-axis direction, is formed as long as the inner side of the pair of third frames 320, and is arranged at a vertical upper end of the second worm 220. In addition, the second worm wheel 340 is preferably formed in the form that teeth are arranged at a lower end of a downwardly protruding curved shape so that the thread and teeth of the second worm 220 sequentially contact each other. In addition, in order for the second worm 220 and the second worm wheel 340 to smoothly engage with each other, the second worm wheel 340 is preferably formed to have a length that protrudes downward from the third frame 320. It is preferable that the length of the second worm wheel 340 is about the length at which the teeth of the lower end of the second worm wheel 340 and the upper thread of the second worm 220 may engage with each other. The third stage 300 is a second shaft 350 that passes through the center of the second worm wheel 340 and is fixed to the pair of third frames 320 on the X axis, respectively, in order to fix the second worm wheel 340. That is, the second shaft 350 penetrates through the center of the second worm wheel 340 on the inner side of the third frame 320 and is arranged in the Y-axis direction. In this case, the second shaft 350 may be composed of a plurality of pieces to strengthen the fixing force. Therefore, since the second worm 220 provided in the second stage 200 rotates on its axis in the forward or reverse direction by driving the motor, the teeth of the second worm wheel 340 provided in the third stage 300 sequentially engage with each other, so the third stage 300 may perform the pitch rotation. In this case, since the second worm gear may absorb the load from the moment of inertia due to the structure of the second worm gear, it is possible to prevent the load from being applied to the motor.

In addition, as illustrated in FIG. 9, each third stage 300 includes a third worm 330 so that the fourth stage 400 performs the yaw rotation about the Z axis, and the fourth stage 400 includes a third worm wheel 421 which is a tooth that engages with the third worm 330. Accordingly, when the third stage 300 and the fourth stage 400 are stacked and arranged, the third worm wheel 421 engages and moves due to the rotation of the third worm 330, so the fourth stage 400 performs the yaw rotation. In more detail, the third worm gear is composed of the third worm wheel 421 formed in a circular shape, and the straight third worm 330 arranged in a tangential direction to the third worm wheel 421. The third worm wheel 421 has teeth arranged in a circular shape. A protruding portion protruding downward with a predetermined area is formed at the lower end of the second plane 410 of the fourth stage 400, and the third worm wheel 421 is arranged along an outer peripheral surface of the protruding portion and is provided in the fourth stage 400. The third worm wheel 421 is preferably arranged from the protruding portion toward the outer side. In this case, the fourth stage 400 and the third stage 300 have a predetermined gap due to the protruding portion. The protruding portion is preferably formed with a diameter smaller than that of the second plane 410, but is preferably formed to have the maximum length in order to drive the fourth stage 400 for a long time. Accordingly, the third worm wheel 421 is formed to have a diameter smaller than that of the second plane 410 and is also formed to have a diameter smaller than the first plane 310. The third worm 330 is arranged on the upper surface of the first plane 310 of the third stage 300 and extends a predetermined length in the tangential direction of the third worm wheel 421. In this case, the third worm 330 is preferably arranged in length along one edge of the first plane 310 which is formed as a rectangular plane. One end of the third worm 330 may be fixed to the first plane 310, and the other end thereof may be formed with a thread formed along the length. The third worm 330 may be arranged on either side of the first plane 310 with its axis in the Y-axis direction. A motor may be connected to one end of the third stage 300, so the third worm 330 may rotate on its axis by receiving power from the motor. In this case, the motor is preferably fixed on the upper side of the second flame 410, and may adjust the yaw rotation direction by rotating forward or reverse. Therefore, since the teeth of the third worm wheel 421 vertically engaged with the thread of the third worm 330 and the thread of the third worm 330 move at an angle perpendicular to each other, they may have a structure that may withstand a load according to the load applied to the swing motion plate 10 of the present disclosure. In addition, since the third worm 330 provided in the third stage 300 rotates on its axis in the forward or reverse direction by driving the motor, the teeth of the third worm wheel 421 provided in the fourth stage 400 sequentially engage with each other, so the fourth stage 400 may perform the yaw rotation. In this case, since the third worm gear may absorb the load from the moment of inertia due to the structure of the third worm gear, it is possible to prevent the load from being applied to the motor.

Figure 10:
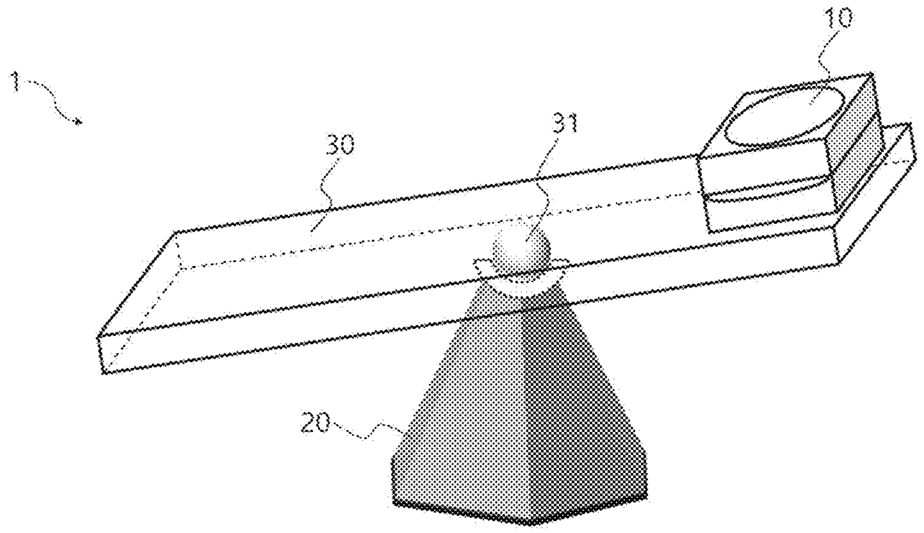
FIG. 10 is a configuration diagram of a motion simulator.

In the motion simulator 1 using the swing motion plate 10 having the above-mentioned characteristics, referring to FIG. 10, the motion simulator 1 includes the roll, pitch, and yaw rotation about 3 axes implemented by the swing motion plate 10, and provides a device that may express more realistic movements by performing additional multiple axes movements using a seesaw structure. Accordingly, the motion simulator 1 may be a simulator that may implement realistic gravitational acceleration as well as front, back, left, and right by including a support and structure that may drive movement on multiple axes in addition to the movement of the swing motion plate 10. The motion simulator 1 is capable of implementing multi-axis simulations for a pilot simulator or for entertainment purposes, and is a flight training simulator of a human-powered aircraft. Alternatively, the motion simulator 1 may be used by passengers as a simulator for entertainment purposes, such as launching situations at a spacecraft launch pad, flying over the Grand Canyon, or moving a high-speed boat at sea, and is a device that may implement actions differentiated from existing ones through smooth movement and performing motion in multiple directions.

Accordingly, the motion simulator 1 of the present disclosure includes a lower support 20 that is supported on the ground and includes a lever support means 31 freely rotating at the upper end, an upper support 30 that has a length in one direction and a center connected to the lever support means 31 and may move from the lower support 20 by the lever support means 31, and a swing motion plate 10 that has the first stage 100, the second stage 200, the third stage 300, and the fourth stage 400 stacked and coupled with each other and is connected to the upper support 30.

Figure 11:
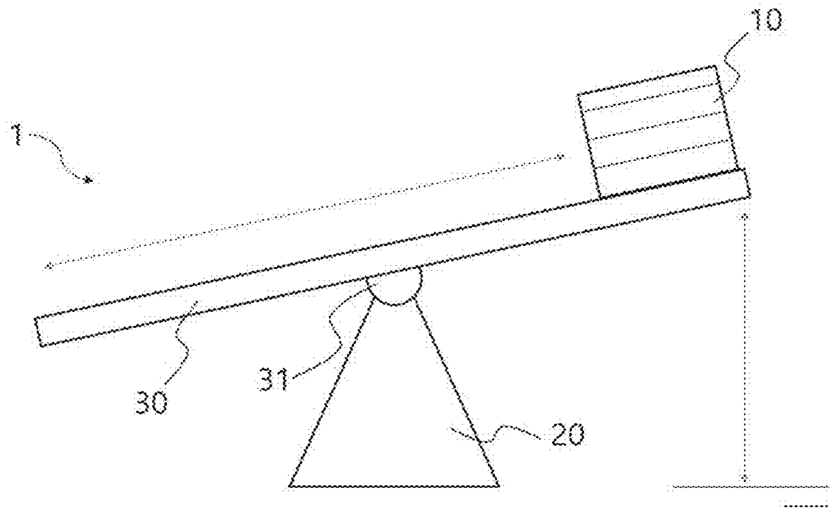
FIG. 11 is a side view of the configuration of the motion simulator.

Referring to FIGS. 10 and 11, the lower support 20 is arranged on the lower side of the motion simulator 1, and is a support supported on the ground or any plane. The lower support 20 includes a predetermined height, and thus, preferably has a form that the upper end has a distance from the ground. The lower support 20 may include a freely rotating lever support means 31 at the upper end. Thereafter, the upper support 30 is coupled with the lever support means 31, and the lever support means 31 is a means by which the upper support 30 may move freely from the lower support 20 and the upper support 30 and the lower support 20 are connected to each other. For example, the lever support means 31 may have a ball joint structure. The lower support 20 may be in the form of a triangular pyramid with a thinner diameter at the upper end in order to have a more stable support force, and the lower support 20 may be of any shape such as circular, triangular, or polygonal as long as the lower end is formed to have a large area.

Figure 12:
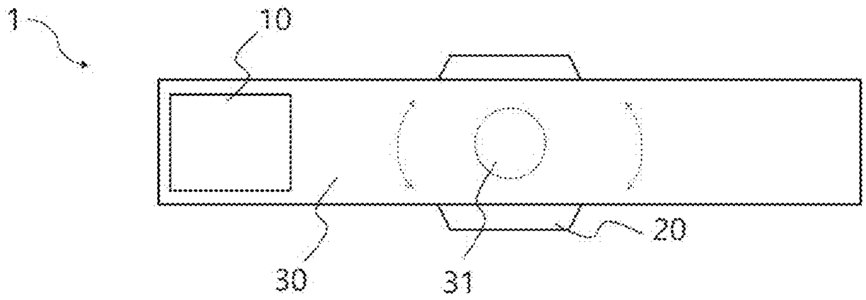
FIG. 12 is a front view of the configuration of the motion simulator.

Referring to FIGS. 10 to 12, the upper support 30 is formed to have a length in one direction and is a support arranged above the lower support 20. The upper support 30 is movably coupled to the lower support 20 through the lever support means 31. That is, since the upper support 30 is arranged above the lower support 20, the motion simulator 1 of the present disclosure may be configured in the form of a seesaw. In this case, the center of the length of the upper support 30 may be coupled to the lever support means 31. In addition, the swing motion plate 10 is later coupled to the upper support 30. Accordingly, as illustrated in FIG. 12, the upper support 30 is movably coupled by the lever support means 31, so the movement about an additional axis may be further implemented by rotating the upper support 30 by the lever support means 31 as well as the pitch, roll, and yaw rotations by the swing motion plate 10. In addition, in one embodiment of the present disclosure, the lever support means 31 has a worm gear structure. In more detail, the lever support means 31 includes a fourth worm wheel arranged in a circular shape with a predetermined diameter on the lower surface of the upper support 30, and a fourth worm arranged in a tangential direction of the fourth worm wheel from the upper end of the lower support 20, and may have a structure in which the fourth worm and the fourth worm wheel engage with each other, and thus, the upper support 30 rotates about the lever support means 31. Accordingly, since the worm gear structure may withstand the load according to the load applied to the upper support 30, it has the effect of being configured as a more stable device.

In addition, the motion simulator 1 may implement movement on multiple axes according to the direction of movement of the upper support 30.

In the direction of the additional axis, the swing motion plate 10 connected to the upper support 30 may be coupled to be movable in the longitudinal direction of the upper support 30, as illustrated in FIG. 11. For example, the swing motion plate 10 may be connected to the upper surface of the upper support 30. In this case, the swing motion plate 10 and the upper support 30 are connected through a rack and pinion gear structure, so the swing motion plate 10 freely slides and moves with respect to the length of the upper support 30, thereby implementing movement in another axial direction.

In addition, as illustrated in FIG. 11, the upper support 30 may implement the movement of the seesaw in that both ends move in the up and down directions. For example, the upper support 30 includes a cable and a motor at both ends, and the motor provided on at least one of both ends may be driven. Accordingly, as the length of the cable connected to the driven motor is adjusted, the distance between the end of the upper support 30 on the corresponding side and the ground is adjusted, and the upper support 30 implements additional movement in the axial direction. In other words, the upper support 30 may realistically implement various movements by implementing directions in which both ends move in an up and down direction.

The swing motion plate and the motion simulator using the same according to the configuration as described above can separately and simultaneously implement movements on multiple axes, including a pitch, a roll, and a yaw, express more movements by separately implementing the speed for each axis, express realistic movement by simulating smoother sliding movement using a worm gear structure, improve the stability of a device through a structure that can distribute a load applied to a motor, and can be easily manufactured by having a simple structure.

Hereinabove, although the present disclosure has been described by specific matters such as detailed components, exemplary embodiments, and the accompanying drawings, they have been provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should not be limited to these exemplary embodiments, but the claims and all of modifications equal or equivalent to the claims are intended to fall within the scope and spirit of the present disclosure.

What is claimed is:

1. A swing motion plate, comprising:

a first stage including a rectangular frame formed by a plurality of flat first frames, and first guide holes formed through the flat surface of a pair of the first frames arranged along a Y-axis direction, having a length in the Y-axis direction and formed in an arc shape;

a second stage including a rectangular frame formed by a plurality of flat second frames stacked on an upper side of the first stage, first protrusions protruding outward in an X-axis direction from a lower end of a pair of the second frames arranged along the Y-axis direction and inserted into the first guide holes, and second guide holes formed through the flat surface of a pair of the second frames arranged along the X-axis direction, having a length in the X-axis direction and formed in an arc shape;

a third stage stacked on an upper side of the second stage, including a first plane having a predetermined area, a pair of flat third frames arranged along the X-axis direction of the first plane, and second protrusions protruding outward in a Y-axis direction from a lower end of the pair of the third frames and inserted into the second guide holes; and a fourth stage stacked on an upper side of the third stage, including a second plane having a predetermined area, a third worm wheel arranged in a circular shape having a predetermined diameter on a lower surface of the second plane, and a third worm extending a predetermined length and arranged at any one end in a direction in which a longitudinal direction is tangent to the third worm wheel in the first plane, for rotating the second plane about a central axis, wherein the first through third stages are driven by relative motion between corresponding guide holes and protrusions of adjacent stages.

2. The swing motion plate of claim 1, wherein the first stage includes a first worm extending a predetermined length in the Y-axis direction, one end of the first worm being fixed to the first frame, and the other end of the first worm having a thread formed along a length, and the second stage includes a first worm wheel that is formed at a position corresponding to the first worm while having a length, a lower end of the first worm being formed in an arc shape and being a tooth engaging with the first worm.

3. The swing motion plate of claim 2, wherein the first worm further includes a motor, and the first worm rotates on its axis by the motor, and engages with the first worm wheel so that the first protrusion moves within the first guide hole and the second stage performs roll rotation.

4. The swing motion plate of claim 2, wherein the second stage is formed to be smaller than an area of the first stage, and an outer side of the second frame is stacked in contact with an inner side of the first frame.

5. The swing motion plate of claim 2, wherein the first worm wheel penetrates through a first shaft connecting an inner side of the pair of the second frames arranged on an X axis and is coupled to the second stage.

6. The swing motion plate of claim 1, wherein the second stage includes a second worm that extends a predetermined length in the X-axis direction, one end of the second worm being fixed to the first frame, and the other end of the second worm having a thread formed along a length, and the third stage includes a second worm wheel that is formed at a position corresponding to the second worm while having a length, a lower end of the second worm being formed in an arc shape and being a tooth engaging with the second worm.

7. The swing motion plate of claim 6, wherein the second worm further includes a motor, and the second worm rotates on its axis by the motor, and engages with the second worm wheel so that the second protrusion moves within the second guide hole and the third stage performs pitch rotation.

8. The swing motion plate of claim 6, wherein the third stage is formed to be smaller than an area of the second stage, and an outer side of the third frame is stacked in contact with an inner side of the second frame.

9. The swing motion plate of claim 6, wherein the second worm wheel penetrates through a second shaft connecting an inner side of the pair of the third frames and is coupled to the third stage.

10. The swing motion plate of claim 1, wherein the third worm further includes a motor, and the third worm rotates on its axis by the motor and engages with the third worm wheel so that the third stage performs yaw rotation.

11. The swing motion plate of claim 1, wherein a diameter of the third worm wheel is smaller than that of the first plane.

12. A motion simulator using the swing motion plate of claim 1, comprising:

a lower support that is supported on a ground and includes a lever support means freely rotating at an upper end;

an upper support having a length in one direction, a center of the upper support being connected to the lever support means, and moving from the lower support by the lever support means; and a swing motion plate having the first stage, the second stage, the third stage, and the fourth stage stacked thereon and coupled to each other, and connected to the upper support.

13. The motion simulator of claim 12, wherein the upper support is connected to the swing motion plate through a rack and pinion gear structure, and moves in a longitudinal direction of the upper support.

14. The motion simulator of claim 13, wherein the upper support includes a cable and a motor formed at both ends thereof, respectively, and a length of the cable is adjusted by driving the motor on at least one of the both ends to adjust a distance between the ground and an end of the upper support.

15. The motion simulator of claim 13, wherein the lever support means includes a fourth worm wheel arranged in a circular shape having a predetermined diameter on a lower surface of the upper support, and a fourth worm arranged in a tangential direction of the fourth worm wheel at an upper end of the lower support, and as the fourth worm and the fourth worm wheel engage with each other, the upper support rotates about the lever support means.

* * * * *